«3,438,859
THYMUS EXTRACT
Pierre De Somer, Louvain, and Pierre Denys, and Roger Leyten, Heverlee, Belgium, assignors to Recherche et Industrie Therapeutiques, R.I.T., Genval, Belgium, a corporation of Belgium
No Drawing. Filed Oct. 27, 1964, Ser. No. 406,891
Int. Cl. C12k 9/00; A01n 1/02
U.S. Cl. 195—1.8                               1 Claim The present invention pertains to a noncellular thymus extract presenting valuable activity for inducing immunological capacity in animal organisms.

It is known that removal of the thymus in early life, at a time when immunological potency has not yet fully developed, is associated with grave disturbances in immune functions, illustrated namely by a marked lymphocytes depletion and the appearance of a fatal wasting syndrome but the mechanism by which thymus is able to establish immunological competence or to restore it after it has been destroyed, is unknown.

It has been suggested that a humoral factor, originating in the thymus, might be responsable for the restoration of immunological faculty of endogenous lymphoid cells, which are unable to express this potential in the absence of thymus.

Nevertheless, if some results were obtained by implants of thymic tissues, isolated thymic extracts useful for inducing immunological capacity in other animals were not known before the present invention.

We have surprisingly found that, using tissue culture media, said humoral factor can be extracted from isolated thymus of young animals.

Thus, the object of the present invention is a process for preparing thymic extracts useful for inducing immunological capacity in living organisms and more particularly in organisms different from these from which the thymus was isolated, said process comprising isolating thymus from young animals, for instance calves, incubating said thymus in a tissue culture medium—for instance Hank's buffered solution, the composition of which is described in Example 1—in classical operative conditions well-known to the art, i.e., at a temperature of about 37° C. for about 24 hours, and collecting the supernatant fluid.

Incidentally, it has been observed that newborn thymic tissue does not contain said humoral factor in detectable quantity. Therefore, in the practice, extraction is carried out on thymus isolated from relatively older animals, as for instance calves approximately from 12 to 15 weeks old as they may be found in slaughterhouses.

The following examples will serve to illustrate the present invention, they are not to be considered as constituting a limitation thereof.

EXAMPLE 1

Preparation of thymus extract

Small fragments of calf thymus, aseptically removed after slaughtering of 15-week-old animal, are suspended in Hank's buffered solution and gently shaken at 37° C. during 48 hours. The harvested fluid is centrifuged twice at 3,000 r.p.m. for 30 minutes to remove cellular debris and the final supernatant fluid is used as thymus extract (CTE) in the following experiments.

The hereabove mentioned Hank's buffered solution is prepared as follows (the amounts are given for obtaining ten liters of final solution).

Enzymatic lactalbumin hydrolyzate (50 g.) is poured into 2 l. of water. The mixture is stirred, warmed up to 56° C. and maintained for half an hour at this temperature.

There is then prepared in another vessel a solution containing:

| | |
|---|---:|
| Sodium chloride _____g__ | 80 |
| Potassium chloride _____g__ | 4 |
| Calcium chloride, anhydrous _____g__ | 1.4 |
| Magnesium sulfate, heptahydrate _____g__ | 1.0 |
| Magnesium chloride, hexahydrate (2 molar aqueous solution) _____ml__ | 2.5 |
| Sodium phosphate dibasic, anhydrous _____g__ | 0.6 |
| Potassium phosphate monobasic, anhydrous ____g__ | 0.6 |
| Phenol red (0.5% solution) _____ml__ | 40 |
| Glucose _____g__ | 10 |
| Water, up to _____l__ | 2 |

This solution is mixed with the above obtained lactalbumin hydrolyzate solution and the following ingredients are added with stirring:

| | |
|---|---:|
| Sodium bicarbonate (7.5% aqueous solution) _____ml__ | 100 |
| Sodium penicillin G _____I.U__ | $2 \times 10^6$ |
| Streptomycin sulfate _____g. (base)__ | 1 |

The total volume is adjusted to 10 liters with water and the solution is filtered.

EXAMPLE 2

Activity of CTE in normal mice

A group of 30 normal 5-week-old mice (NMRI strain) is inoculated intraperitoneally with one dosis of 0.5 ml. calf thymus extract (CTE). Total and differential peripheral white blood cells counts are obtained at regular intervals from eye puncture. Blood smears are stained with May-Grünwald-Giemsa. As control material, calf spleen extract obtained according to the same technique as that described for CTE in Example 1 is similarly administered to another group of 30 normal 5-week-old mice (NMRI strain). As indicated in Table 1, administration of CTE is quickly followed by a temporary increase of the mean white blood cells count, affecting proportionally more the lymphocytes and reaching a maximum level at approximately three to four days after inoculation, when administration of spleen extract does not affect the peripheral blood picture.

TABLE 1.—TOTAL AND DIFFERENTIAL WHITE BLOOD CELLS COUNTS (W.B.C.) IN PERIPHERAL BLOOD AFTER A SINGLE DOSE OF EXTRACT

| | Before treatment (5 w. old) | CTE | | | Spleen extract | | |
|---|---|---|---|---|---|---|---|
| | | 2 d. | 4 d. | 6 d. | 2 d. | 4 d. | 6 d. |
| Total W.B.C_ | 7,800 | 11,000 | 13,100 | 8,000 | 8,000 | _____ | 7,700 |
| L_____ | 6,500 | 9,500 | 11,500 | _____ | 6,700 | _____ | 6,500 |
| P_____ | 1,100 | 1,100 | 1,400 | _____ | 1,100 | _____ | 1,000 |
| M_____ | 200 | 400 | 200 | _____ | 200 | _____ | 200 |

L=Lymphocytes. P=Polynuclears. M=Monocytes.

For testing if repeated inoculations would be able to induce a lymphocytic leukemia syndrome, groups of 30 normal 5-week-old mice are inoculated daily for a period of five days either with 0.5 ml. CTE or with spleen extract as a control. Table 2 shows that, after such a CTE treatment, there is first a marked decrease in lymphocytes followed by an increased number of white blood cells, reaching its maximum 7 days after the last inoculation.

One week later, the white blood cells count is normal again.

TABLE 2.—TOTAL AND DIFFERENTIAL WHITE BLOOD CELLS COUNTS (W.B.C.) IN PERIPHERAL BLOOD AFTER 5 DOSES OF EXTRACT

| | Before treatment | CTE | | | Spleen extract | | |
|---|---|---|---|---|---|---|---|
| | | 1 d. | 3 d. | 7 d. | 1 d. | 3 d. | 7 d. |
| Total W.B.C. | 7,600 | 5,000 | 10,400 | 13,200 | 7,800 | | 8,000 |
| L | 6,400 | 3,600 | 8,400 | 10,700 | | | 6,600 |
| P | 1,000 | 1,150 | 1,600 | 2,100 | | | 1,200 |
| M | 200 | 250 | 400 | 400 | | | 200 |

L=Lymphocytes. P=Polynuclears. M=Monocytes.

EXAMPLE 3

Activity of CTE in thymectomized mice (a) Technique of thymectomy.—Removal of the thymus is regularly performed within the 12 first hours after birth. Newborn mice are first cooled for 30 minutes in the refrigerator so as to bring their body temperature at about 5° C. This cooling phase prevents excessive bleeding and motions during the operation. The thymus appears as a bilobal organ located behind the upper part of the manubrium sterni. After incising the skin and the sternum between the first and the second intercostal space, the thymus is removed with a Pasteur pipot connected to a succion pump. This operation is performed under a Zeiss stereoscopic microscope. The operation wound is closed with collodion and the animals are warmed again under an infrared lamp. Mortality after operation never exceeds 10%.

(b) Testing and results.—Neonatal thymectomy is associated with a progressive lymphoid depletion from the time of thymectomy until death. At about 5 weeks of age, the mice develop a fatal wasting syndrome. Death occurs approximately in the 10th week. The activity of CTE in neonatally thymectomized animals is tested either with a single dose or with repeated doses administered to groups of 20 animals at 3 weeks of age.

As shown in Table 3, intraperitoneal administration of a single 0.5 ml. dose of CTE to 3-week-old mice neonatally thymectomized restores a normal white blood cells count within 3 days. At 7 weeks of age, the animals are sacrified for histological examination. At that time, as shown in Table 3, a marked difference in peripheral blood picture is observed between treated and untreated thymectomized animals: treated animals have a normal white blood cells count, untreated animals are in severe peripheral lymphocytes depletion. At that same time, no sign of wasting syndrome is observed in the treated animals and gross appearance of their spleen is normal, whereas the untreated animals are in a severe state of deterioration and involution of their spleen is evidenced by a reduction in size and weight.

TABLE 3.—TOTAL AND DIFFERENTIAL WHITE BLOOD CELLS COUNTS (W.B.C.) IN PERIPHERAL BLOOD OF THYMECTOMIZED MICE AFTER A SINGLE DOSE OF EXTRACT

| | Before treatment (3 w. old) | CTE treated | | Control untreated | |
|---|---|---|---|---|---|
| | | 3 d. | 30 d. | 3 d. | 30 d. |
| Total W.B.C. | 2,800 | 7,150 | 8,600 | 2,400 | 1,800 |
| L | 1,030 | 4,500 | 6,100 | 960 | 600 |
| P | 1,570 | 1,950 | 1,700 | 1,290 | 1,080 |
| M | 200 | 700 | 800 | 150 | 120 |

L=Lymphocytes. P=Polynuclears. M=Monocytes.

In a following experiment, a group of 30 mice thymectomized at birth is inoculated intraperitoneally every three days with CTE, starting immediately after the operation. Control groups of untreated thymectomized and normal animals are also included. Table 4 shows that 5 weeks later, after having received 8 injections of CTE, the treated thymectomized animals have a normal mean weight and a normal blood picture. The untreated thymectomized animals have a marked reduction of weight and lymphocytes.

TABLE 4.—MEAN PERIPHERAL WHITE BLOOD CELLS COUNTS (W.B.C.) AND MEAN WEIGHT OF TREATED AND UNTREATED THYMECTOMIZED MICE

| | Normal untreated mice | Thymectomized untreated mice | Thymectomized treated mice [1] |
|---|---|---|---|
| Total W.B.C. | 7,100 | 2,600 | 6,300 |
| L | 5,500 | 1,100 | 4,600 |
| P | 1,200 | 1,300 | 1,300 |
| M | 400 | 200 | 400 |
| Mean weight (g.) | 22.2 | 11.9 | 22.6 |

[1] 8 injections of CTE.
L=Lymphocytes. P=Polynuclears. M=Monocytes.

(c) Activity of CTE in thymectomized mice infected with adenovirus type 4.

A group of 22 newborn mice are thymectomized and infected with adenovirus immediately after birth and are treated with 0.2 ml. of CTE administered intraperitoneally twice weekly. A group of 24 untreated thymectomized infected mice are used as control.

Three weeks later, the mean white blood cells count is 4,400 (with 75 percent lymphocytes and 20 percent neutrophils) in the treated group, whereas the untreated group only has 2,500 white blood cells per cubic millimeter with 36 percent lymphocytes and 60 percent neutrophils.

After five weeks, 21 of the 22 treated animals are still in life, whereas only 11 of the 24 untreated animals survives. In this last group, death occurs with symptoms of deterioration similar to the wasting syndrome usually observed in untreated thymectomized mice.

We claim:

1. A noncellular thymus extract capable of inducing immunological capacity in mice, prepared by isolating thymus from a young calf, incubating said thymus at about 37° C. for about 24–48 hours in a tissue culture medium, said medium comprising:

| | |
|---|---|
| Enzymatic lactalbumin hydrolyzate g | 50 |
| Sodium chloride g | 80 |
| Potassium chloride g | 4 |
| Calcium chloride, anhydrous g | 1.4 |
| Magnesium sulfate heptahydrate g | 1.0 |
| Magnesium chloride hexahydrate (2 molar aqueous solution) ml | 2.5 |
| Sodium phosphate dibasic, anhydrous g | 0.6 |
| Potassium phosphate monobasic, anhydrous g | 0.6 |
| Phenol red (0.5% solution) ml | 40 |
| Glucose g | 10 |
| Sodium bicarbonate (7.5% aqueous solution) ml | 100 |
| Sodium penicillin G I.U. | $2 \times 10^6$ |
| Streptomycin sulfate g. (base) | 1 |
| Distilled water, q.s. liters | 10 | centrifuging the harvested fluid to remove cellular debris, and collecting the supernatant fluid containing said thymus extract.

References Cited

UNITED STATES PATENTS 3,170,839  2/1965  Oh.

OTHER REFERENCES

Cohen et al.: Chemical Abstracts, volume 58, column 11838(b) 1963.

Zatcer et al.: Science, vol. 120, pp. 507–508, 1954.

Gey et al.: Texas Rep. Biol. Med., vol. 12, pp. 805–809.

The Wall Street Journal for Feb. 17, 1967, pp. 1 and 14.

ALBERT T. MEYERS, *Primary Examiner.*

J. GOLDBERG, *Assistant Examiner.*

U.S. Cl. X.R.

424—88